US009457670B2

(12) United States Patent
Fujiyoshi et al.

(10) Patent No.: US 9,457,670 B2
(45) Date of Patent: Oct. 4, 2016

(54) POWER GENERATION CONTROL APPARATUS FOR HYBRID VEHICLE

(75) Inventors: Tadashi Fujiyoshi, Susono (JP); Takahiro Shiina, Susono (JP); Akira Murakami, Gotemba (JP); Tatsuya Miyano, Nagakute (JP); Takao Watanabe, Nagakute (JP); Ryoichi Hibino, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/366,924

(22) PCT Filed: Jun. 4, 2012

(86) PCT No.: PCT/JP2012/064387
§ 371 (c)(1),
(2), (4) Date: Jun. 19, 2014

(87) PCT Pub. No.: WO2013/094239
PCT Pub. Date: Jun. 27, 2013

(65) Prior Publication Data
US 2014/0365055 A1    Dec. 11, 2014

(30) Foreign Application Priority Data
Dec. 20, 2011  (JP) ................................ 2011-278308

(51) Int. Cl.
*B60W 10/06* (2006.01)
*B60W 10/08* (2006.01)
(Continued)

(52) U.S. Cl.
CPC ............... *B60L 11/14* (2013.01); *B60K 6/448* (2013.01); *B60K 6/547* (2013.01); *B60L 7/14* (2013.01); *B60L 11/123* (2013.01); *B60L 15/2009* (2013.01); *B60W 10/06* (2013.01); *B60W 10/08* (2013.01); *B60W 20/13* (2016.01); *B60W 20/15* (2016.01); *B60L 2220/52* (2013.01);
(Continued)

(58) Field of Classification Search
CPC ............. B60W 20/10; B60W 20/108; B60W 20/1088; B60W 10/06; B60W 10/08; Y02T 903/93
See application file for complete search history.

(56) References Cited

U.S. PATENT DOCUMENTS 6,155,954 A * 12/2000 Itoyama et al. ................... 477/5
6,225,784 B1 * 5/2001 Kinoshita et al. ............. 320/132
(Continued)

FOREIGN PATENT DOCUMENTS

JP    07-236203 A    9/1995
JP    08-037702 A    2/1996
(Continued)

*Primary Examiner* — Dale W Hilgendorf
(74) *Attorney, Agent, or Firm* — Kenyon & Kenyon LLP

(57) ABSTRACT

In a power generation control apparatus applied to a hybrid vehicle including a compound motor in which a wound rotor is connected to an internal combustion engine and a magnet rotor is connected to a transmission, when regenerative power generation is underway and the internal combustion engine is operative, a first motor/generator constituted by the wound rotor and the magnet rotor and the internal combustion engine are controlled such that torque output from the internal combustion engine is increased by torque applied to the internal combustion engine from the first motor/generator, and a power generation amount of a second motor/generator constituted by the magnet rotor and a stator is increased such that torque transmitted to an output shaft from the internal combustion engine is not applied to a drive wheel.

5 Claims, 12 Drawing Sheets

(51) Int. Cl.
*B60W 20/00* (2006.01)
*B60L 11/14* (2006.01)
*B60L 11/12* (2006.01)
*B60K 6/448* (2007.10)
*B60K 6/547* (2007.10)
*B60L 7/14* (2006.01)
*B60L 15/20* (2006.01)
*F02D 29/02* (2006.01)
*F02D 29/06* (2006.01)

(52) U.S. Cl.
CPC ..... *B60L2240/421* (2013.01); *B60L 2240/423* (2013.01); *B60L 2240/441* (2013.01); *B60L 2240/443* (2013.01); *F02D 29/02* (2013.01); *F02D 29/06* (2013.01); *Y02T 10/6217* (2013.01); *Y02T 10/6243* (2013.01); *Y02T 10/6286* (2013.01); *Y02T 10/641* (2013.01); *Y02T 10/645* (2013.01); *Y02T 10/7077* (2013.01); *Y02T 10/72* (2013.01); *Y02T 10/7275* (2013.01); *Y10S 903/93* (2013.01)

(56) References Cited

U.S. PATENT DOCUMENTS

| | | | | |
|---|---|---|---|---|
| 6,335,573 | B1* | 1/2002 | Eguchi et al. | 290/40 C |
| 8,790,202 | B2* | 7/2014 | Sakai | B60K 6/547 475/5 |
| 8,827,852 | B2* | 9/2014 | Ikegami | B60K 6/547 475/5 |
| 2008/0242463 | A1* | 10/2008 | Yamada et al. | 475/5 |
| 2012/0115674 | A1* | 5/2012 | Ikegami | 477/3 |

FOREIGN PATENT DOCUMENTS

| | | |
|---|---|---|
| JP | 2001224105 A | 8/2001 |
| JP | 2002-095101 A | 3/2002 |
| JP | 2007253658 A | 10/2007 |
| JP | 2009-274536 A | 11/2009 |
| JP | 2010-280363 A | 12/2010 |

* cited by examiner

F I G. 1
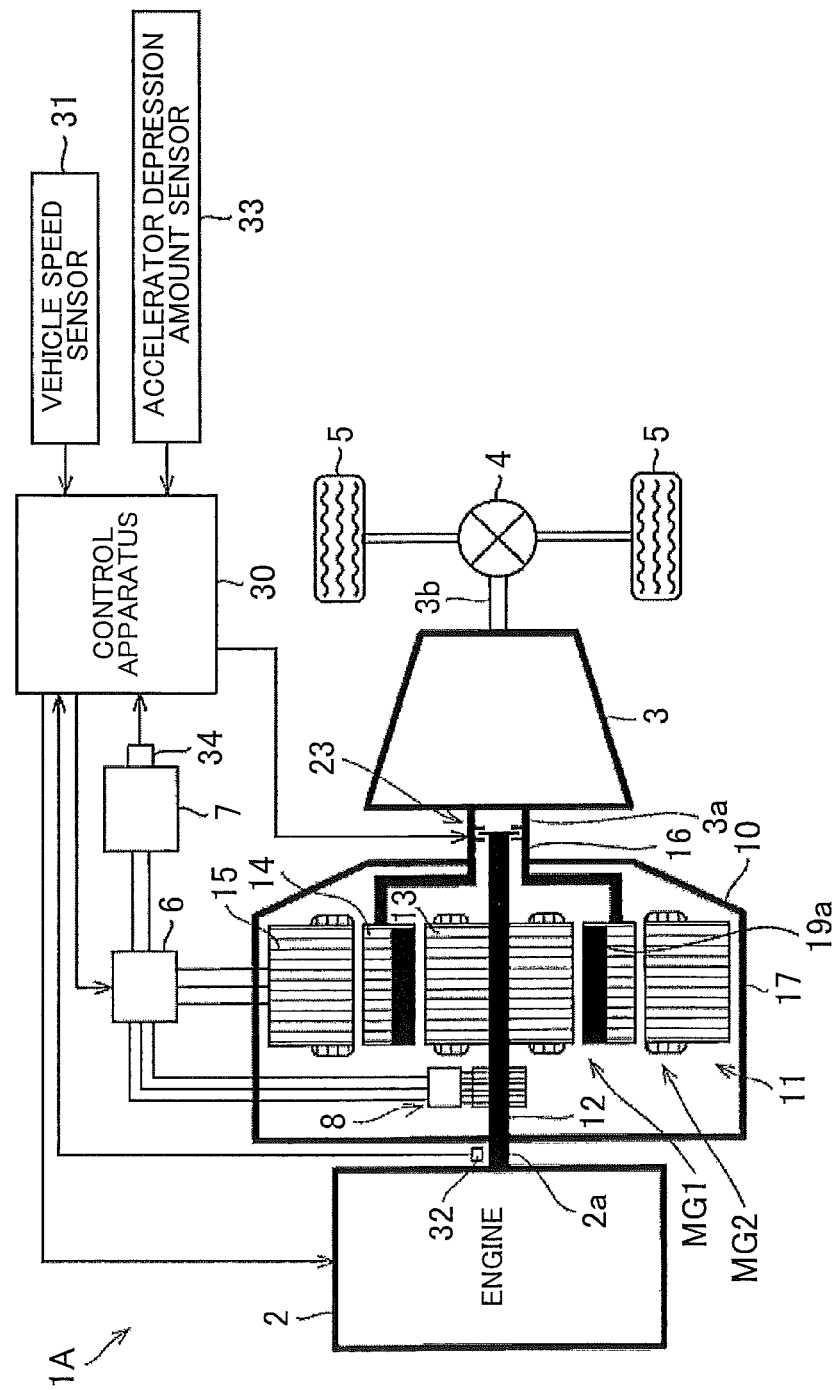

POWER GENERATION CONTROL APPARATUS FOR HYBRID VEHICLE

CROSS-REFERENCE TO RELATED APPLICATIONS

This is a national phase application based on the PCT International Patent Application No. PCT/JP2012/064387 filed Jun. 4, 2012, claiming priority to Japanese patent application No. 2011-278308 filed Dec. 20, 2011, the entire contents of both of which are incorporated herein by reference.

TECHNICAL FIELD

The invention relates to a power generation control apparatus that is applied to a hybrid vehicle including: an internal combustion engine; an output member to which torque output from the internal combustion engine is transmitted and which is connected to a drive wheel to be capable of power transmission; a motor provided to be capable of applying torque output thereby to the internal combustion engine; and a generator connected to the output member.

BACKGROUND ART

A conventional hybrid vehicle includes a power distribution planetary gear mechanism having a sun gear, a carrier, and a ring gear to which a first motor/generator, an internal combustion engine, and a reduction mechanism that outputs power to a drive wheel are respectively connected, and a second motor/generator capable of outputting power to the ring gear of the planetary gear mechanism. A conventional control apparatus for this type of hybrid vehicle performs acceleration travel, in which the vehicle is accelerated by driving the vehicle using an output of the internal combustion engine, and inertial travel, in which the internal combustion engine is set in an inoperative condition such that the vehicle is caused to travel by inertia, alternately within a predetermined vehicle speed region. Further, in this type of conventional control apparatus, when the vehicle travels on a road surface having a downward gradient during the acceleration travel, the apparatus chooses either to maintain the acceleration travel or to switch to the inertial travel in order to reduce a fuel consumption rate, or in other words to increase a thermal efficiency of the internal combustion engine (see Patent Document 1). Patent Documents 2 to 4 are available as further related art documents relating to the invention.

Patent Document 1: Japanese Patent Application Publication No. 2010-280363 (JP 2010-280363 A)
Patent Document 2: Japanese Patent Application Publication No. 08-037702 (JP 08-037702 A)
Patent Document 3: Japanese Patent Application Publication No. 2002-095101 (JP 2002-095101 A)
Patent Document 4: Japanese Patent Application Publication No. 2009-274536 (JP 2009-274536 A)

SUMMARY OF THE INVENTION

Patent Document 1 discloses control for increasing the thermal efficiency of the internal combustion engine when the vehicle travels on a road surface having a downward gradient during acceleration travel. However, Patent Document 1 neither discloses nor even mentions control for improving the thermal efficiency of the internal combustion engine while regenerative power generation is underway.

An object of the invention is therefore to provide a power generation control apparatus for a hybrid vehicle, with which improvements can be achieved in a thermal efficiency of an internal combustion engine and an energy efficiency of the vehicle while regenerative power generation is underway.

A power generation control apparatus according to the invention is applied to a hybrid vehicle including: an internal combustion engine; an output member to which torque output from the internal combustion engine is transmitted and which is connected to a drive wheel to be capable of power transmission; a motor provided to be capable of applying torque output thereby to the internal combustion engine; a generator connected to the output member; and a battery that is electrically connected respectively to the motor and the generator. The power generation control apparatus executes regenerative power generation using the generator when the output member is driven to rotate by power input from the drive wheel, and includes power generation amount increasing means for, when the regenerative power generation is underway and the internal combustion engine is operative, controlling the internal combustion engine and the motor respectively such that the output torque output from the internal combustion engine is increased above idling torque output from the internal combustion engine during an idling operation by the torque applied thereto from the motor, and increasing a power generation amount of the generator such that the torque transmitted to the output member from the internal combustion engine is not applied to the drive wheel.

Typically, when regenerative power generation is underway, it is not necessary to drive the drive wheel using the internal combustion engine, and therefore the internal combustion engine performs an idling operation. As is commonly recognized, when substantially no torque is output from the internal combustion engine, the thermal efficiency of the internal combustion engine decreases. Further, when the torque of the internal combustion engine increases, the thermal efficiency of the internal combustion engine also increases. During an idling operation, substantially no torque is output from the internal combustion engine, and therefore the thermal efficiency of the internal combustion engine is low. In the power generation control apparatus according to the invention, torque is applied to the internal combustion engine from the motor in such a case, leading to an increase in the output torque of the internal combustion engine. Hence, the thermal efficiency of the internal combustion engine can be increased. Power generation is then performed using the output torque of the internal combustion engine exhibiting increased thermal efficiency, and therefore the power generation amount can be increased using a small amount of fuel. As a result, an improvement in fuel efficiency can be achieved. Furthermore, an energy efficiency of the vehicle can be improved.

In an aspect of the power generation control apparatus according to the invention, when the regenerative power generation is underway and the internal combustion engine is operative, the power generation amount increasing means may first control the internal combustion engine such that the output torque of the internal combustion engine is increased above the idling torque, then control the motor such that a variation amount in a rotation speed of the internal combustion engine before and after the output torque of the internal combustion engine is increased by the torque applied to the internal combustion engine from the motor falls below a predetermined allowable value, and then control the generator such that the increase in the output torque of the internal combustion engine increased by the torque applied thereto from the motor is canceled out by the increase in the power generation amount of the generator. According to this aspect, when the power generation amount of the generator is to be increased, first, the output torque of the internal combustion engine is increased. In this case, an amount of heat generated by the internal combustion engine can be increased quickly. Hence, when the internal combustion engine is warmed up, a warm-up operation can be completed quickly.

In an aspect of the power generation control apparatus according to the invention, when the regenerative power generation is underway and the internal combustion engine is operative, the power generation amount increasing means may first control the motor such that a predetermined load torque by which the output torque of the internal combustion engine is increased above the idling torque is applied to the internal combustion engine from the motor, and then control the internal combustion engine such that a variation amount in a rotation speed of the internal combustion engine before and after the load torque is applied from the motor falls below a predetermined allowable value, and control the generator such that the increase in the output torque of the internal combustion engine increased by the load torque applied thereto from the motor is canceled out by the increase in the power generation amount of the generator. As is commonly recognized, when the torque or the rotation speed of the motor is modified, the motor can be adjusted to the modified value more quickly than the internal combustion engine. According to this aspect, when the power generation amount of the generator is to be increased, the torque of the motor is modified first. As a result, the power generation amount of the generator can be increased quickly.

In an aspect of the power generation control apparatus according to the invention, the power generation amount increasing means may control the internal combustion engine, the motor, and the generator such that the increase in the power generation amount of the generator increased by increasing the output torque of the internal combustion engine is smaller than a preset upper limit value. In this case, the increase in the power generation amount can be prevented from becoming excessive, and therefore the battery can be prevented from being fully charged. Further, by preventing the increase in the power generation amount from becoming excessive, an excessive load can be prevented from being applied to the internal combustion engine.

In an aspect of the power generation control apparatus according to the invention, the hybrid vehicle may be provided with a rotating electric machine including: a first rotor that includes a plurality of coils and is provided to be capable of rotating about an axis; a second rotor that includes a magnet, is disposed on an outer periphery of the first rotor to be coaxial with the first rotor, and is provided to be capable of rotating relative to the first rotor; and a stator that includes a plurality of coils and is provided on an outer periphery of the second rotor to be coaxial with the first rotor and the second rotor, wherein the first rotor may be connected to the internal combustion engine, the second rotor may be connected to the output member, the motor may be constituted by the first rotor and the second rotor, and the generator may be constituted by the second rotor and the stator. By forming the motor and the generator from a single rotating electric machine in this manner, the power generation control apparatus can be installed in the vehicle more easily.

In this aspect, the hybrid vehicle may be provided with clutch means that can be switched between an engaged condition in which the first rotor and the second rotor rotate integrally and a disengaged condition in which the first rotor and the second rotor are capable of relative rotation, and when the regenerative power generation is underway and the internal combustion engine is operative, the power generation amount increasing means may switch the clutch means to the disengaged condition. According to this aspect, by switching the clutch means to the engaged condition, the internal combustion engine and the output member are directly connected, and therefore wasteful consumption of the torque output from the internal combustion engine can be prevented. When the power generation amount is increased while regenerative power generation is underway, on the other hand, the clutch means are switched to the disengaged condition, and therefore the power input into the output member from the drive wheel can be prevented from being transmitted to the internal combustion engine.

In an aspect of the power generation control apparatus according to the invention, the power generation amount increasing means may control the internal combustion engine, the motor, and the generator such that the increase in the power generation amount of the generator, which is generated by increasing the output torque of the internal combustion engine, decreases as a storage rate of the battery increases. By adjusting the increase in the power generation amount in this manner, the battery can be prevented from being fully charged.

BRIEF DESCRIPTION OF THE DRAWINGS

FIG. 1 is a schematic view showing a hybrid vehicle incorporating a power generation control apparatus according to a first embodiment of the invention.

MODES FOR CARRYING OUT THE INVENTION

First Embodiment

Figure 2:
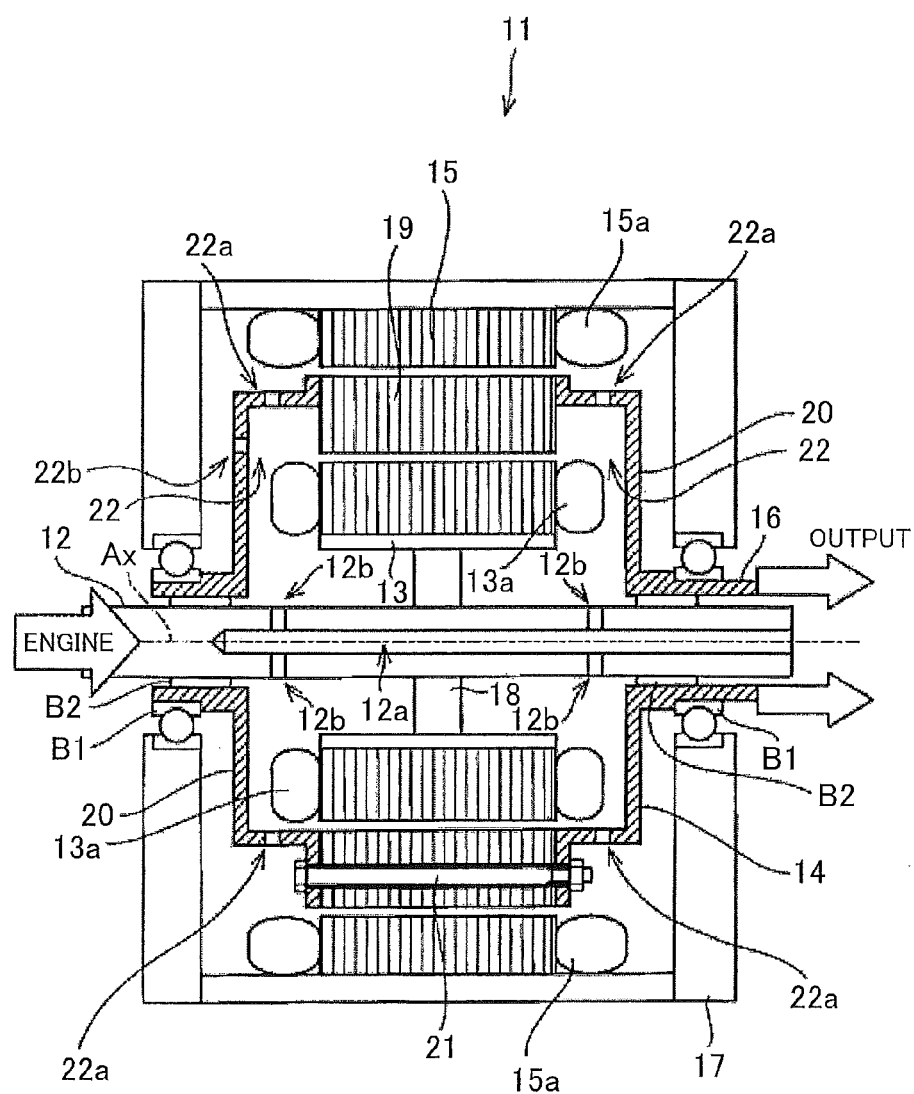
FIG. 2 is an enlarged view showing a compound motor provided in the vehicle.

FIG. 1 is a schematic view showing a hybrid vehicle incorporating a power generation control apparatus according to a first embodiment of the invention. An internal combustion engine (also referred to hereafter as an engine) 2 is installed in a vehicle 1A as a travel power source. The engine 2 is a conventional engine installed in a vehicle such as an automobile, and therefore detailed description thereof has been omitted. Although not shown in the drawing, accessories such as a power steering and an air-conditioner are connected to an output shaft 2a of the engine 2. These accessories are driven by rotation of the output shaft 2a. A transmission 3 is also installed in the vehicle 1A. The transmission 3 is a conventional transmission configured to be capable of switching between a plurality of speed ratios differing from each other in a magnitude of a speed ratio between an input shaft 3a and an output shaft 3b. Hence, detailed description of the transmission 3 has likewise been omitted. The output shaft 3b of the transmission 3 is connected to left and right drive wheels 5 via a differential mechanism 4. As shown in the drawing, a power transmission apparatus 10 is provided between the engine 2 and the transmission 3.

The power transmission apparatus 10 includes a compound motor 11 serving as a rotating electric machine. FIG. 2 is an enlarged view of the compound motor 11. As shown in the drawing, the compound motor 11 includes an input shaft 12, a wound rotor 13 serving as a first rotor, a magnet rotor 14 serving as a second rotor, a stator 15, and an output shaft 16 serving as an output member. The wound rotor 13, the magnet rotor 14, and the stator 15 are housed in a case 17. As shown in FIG. 1, the input shaft 12 is connected to the output shaft 2a of the engine 2. Further, the output shaft 16 is connected to the input shaft 3a of the transmission 3. As shown in FIG. 2, the magnet rotor 14 is supported on the case 17 via a pair of bearings B1 to be capable of rotating about an axis Ax. The input shaft 12 is supported on the magnet rotor 14 via a pair of bearings B2 to be capable of rotating about the axis Ax. The input shaft 12 and the magnet rotor 14 are thus provided to be capable of relative rotation.

The wound rotor 13 is configured in a tubular shape such that a space is formed in an inner periphery thereof. An inner diameter of the wound rotor 13 is larger than an outer diameter of the input shaft 12. The wound rotor 13 is disposed on an outer periphery of the input shaft 12 so as to be coaxial with the input shaft 12. The input shaft 12 and the wound rotor 13 are connected by a connecting member 18 to rotate integrally. By connecting the wound rotor 13 and the input shaft 12 in this manner, the wound rotor 13 is provided to be capable of rotating about the axis Ax. Furthermore, the wound rotor 13 and the magnet rotor 14 are thus capable of rotating relative to each other. The wound rotor 13 includes a plurality of coils 13a. By causing a current to flow through the plurality of coils 13a in a predetermined sequence, a rotating magnetic field that rotates in a circumferential direction is generated.

An oil supply passage 12a is provided in a center of the input shaft 12 to extend in an axial direction. Further, a plurality of oil supply holes 12b are provided in the input shaft 12 so as to extend radially outward from the oil supply passage 12a and open onto an outer peripheral surface. The oil supply holes 12b are provided to be positioned on a radial direction inner side of respective coil ends of the coils 13a of the wound rotor 13. Oil is supplied to the oil supply passage 12a from an oil pump, not shown in the drawings. The oil is discharged through the respective oil supply holes 12b and applied to the coil ends of the coils 13a. As a result, the coils 13a are cooled by the oil.

The stator 15 is formed in a cylindrical shape. An inner diameter of the stator 15 is larger than an outer diameter of the wound rotor 13 and an outer diameter of the magnet rotor 14. The stator 15 is provided on a radial direction outer side of the wound rotor 13 so as to be coaxial with the wound rotor 13. The stator 15 is fixed to the case 17 to be incapable of rotating. The stator 15 includes a plurality of coils 15a. By causing a current to flow through the plurality of coils 15a in a predetermined sequence, a rotating magnetic field that rotates in the circumferential direction is generated.

The magnet rotor 14 is configured such that a space is formed on an inner periphery thereof, similarly to the wound rotor 13. The magnet rotor 14 is provided on an outer periphery of the wound rotor 13 and an inner periphery of the stator 15 to be coaxial with both the wound rotor 13 and the stator 15. Further, the magnet rotor 14 is provided such that predetermined gaps are formed respectively between the magnet rotor 14 and the wound rotor 13 and between the magnet rotor 14 and the stator 15. Thus, the wound rotor 13, the magnet rotor 14, and the stator 15, when seen from the axial direction, are disposed concentrically in order of the wound rotor 13, the magnet rotor 14, and the stator 15 from the inner side.

The magnet rotor 14 includes an annular rotor core 19, and end plates 20 attached to respective end portions of the rotor core 19. The end plates 20 are fixed to the rotor core 19 by a plurality of fastening bolts 21. A plurality of permanent magnets 19a (see FIG. 1) are provided in the rotor core 19 so as to be arranged at predetermined intervals in the circumferential direction. As shown in the drawings, the end plates 20 are partially separated from the rotor core 19 in the axial direction. An oil reservoir 22 is formed in the parts where the end plates 20 are separated from the rotor core 19. A plurality of oil discharge holes 22a, 22b for discharging oil from the inside of the magnet rotor 14 to the outside are provided in the oil reservoir 22. The oil discharged through the oil supply holes 12b in the input shaft 12 is stored in the oil reservoir 22. This oil is discharged through the oil discharge holes 22a, 22b and applied to the coils 15a of the stator 15. As a result, the coils 15a are cooled by the oil.

As shown in FIG. 1, the respective coils 15a of the stator 15 are electrically connected to a battery 7 via an inverter 6. Further, the rotor 13a of the wound rotor 13 is electrically connected to the battery 7 via a slip ring mechanism 8 and the inverter 6. Note that the slip ring mechanism 8 is a conventional mechanism that transmits electricity between a slip ring provided on a rotary body and a brush that contacts the ring. Hence, detailed description thereof has been omitted.

The power transmission apparatus 10 is provided with a lockup clutch 23 serving as clutch means. The lockup clutch 23 is configured to be capable of switching between an engaged condition, in which the wound rotor 13 and the magnet rotor 14 are engaged so as to rotate integrally, and a disengaged condition, in which the engagement is released so that the wound rotor 13 and the magnet rotor 14 rotate separately. A conventional hydraulic clutch, for example, may be used as the lockup clutch 23, and therefore detailed description thereof has been omitted.

In the compound motor 11, both the wound rotor 13 and the stator 15 are provided with coils, and therefore a rotating magnetic field can be generated by both. Accordingly, the magnet rotor 14 can be rotated by the generated rotating magnetic fields. In other words, the compound motor 11 includes a first motor/generator MG1 constituted by the wound rotor 13 and the magnet rotor 14, and a second motor/generator MG2 constituted by the stator 15 and the magnet rotor 14. The compound motor 11 uses the two motor/generators MG1, MG2 appropriately to transmit power from the engine 2 to the transmission 3. For example, when the input shaft 12 is driven to rotate by the engine 2, electricity is generated by the coils 13a of the wound rotor 13, and as a result, a magnetic force is generated. Hence, as the wound rotor 13 rotates, the magnet rotor 14 also rotates. At this time, the magnet rotor 14 rotates in an identical direction to the wound rotor 13, and therefore rotation is transmitted to the transmission 3 from the output shaft 16. Furthermore, in the compound motor 11, the electricity generated by the coils 13a at this time is supplied to the coils 15a of the stator 15 via the inverter and so on, and therefore a rotating magnetic field can be generated by the coils 15a. Accordingly, the magnet rotor 14 can be driven to rotate. Hence, with the compound motor 11, the magnet rotor 14 can be driven using both the magnetic force and the power generated by the wound rotor 13. In this case, a driving torque of the magnet rotor 14 can be amplified, and therefore the compound motor 11 functions similarly to a conventional torque converter.

Operations of the engine 2, the compound motor 11, and the lockup clutch 23 are controlled by a control apparatus 30. The control apparatus 30 is constituted by a computer unit including a microprocessor and peripheral devices such as a random access memory (RAM) and a read only memory (ROM) required to operate the microprocessor. The control apparatus 30 holds various control programs for causing the vehicle 1A to travel appropriately. By executing these programs, the control apparatus 30 performs control on control subjects such as the engine 2 and the compound motor 11. Note that the control apparatus 30 controls the first motor/generator MG1 and the second motor/generator MG2 of the compound motor 11 by controlling the inverter 6. Various sensors are connected to the control apparatus 30 to obtain information relating to the vehicle 1A. For example, a vehicle speed sensor 31 that outputs a signal corresponding to a speed (a vehicle speed) of the vehicle 1A, a crank angle sensor 32 that outputs a signal corresponding to a rotation speed of the output shaft 2a of the engine 2, an accelerator depression amount sensor 33 that outputs a signal corresponding to an accelerator depression amount, a state of charge (SOC) sensor 34 that outputs a signal corresponding to a state of charge (a storage rate) of the battery 7, and so on are connected to the control apparatus 30. Various other sensors are also connected, but these sensors have been omitted from the drawings.

Next, the control executed by the control apparatus 30 will be described. When the vehicle 1A is decelerating, traveling on a downhill slope, or the like, the control apparatus 30 causes the second motor/generator MG2 to function as a generator. Accordingly, regenerative power generation is executed by driving the magnet rotor 14 to rotate using power input into the output shaft 16 from the drive wheels 5. Electricity generated by the regenerative power generation is charged to the battery 7.

Further, when regenerative power generation is underway and the engine 2 is operative, the control apparatus 30 can execute power generation amount increase control. In the power generation amount increase control, the first motor/generator MG1 is caused to function as a motor such that a load torque is applied to the engine 2. Further, an output of the engine 2 is increased so that even when the load torque is applied thereto from the first motor/generator MG1, the rotation speed of the engine 2 exhibits substantially no variation. Furthermore, the power generation amount of the second motor/generator MG2 is increased so that a variation in the output torque of the engine 2 is not applied to the drive wheels 5.

Figure 3:
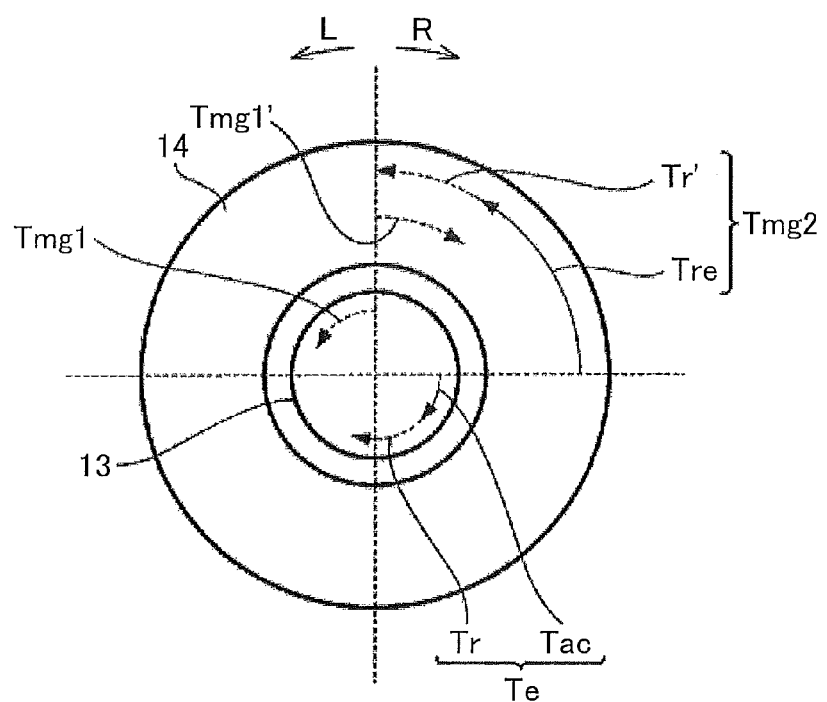
FIG. 3 is a view illustrating an output torque of an internal combustion engine and an output torque of a second motor/generator when power generation amount increase control is underway.

Referring to FIG. 3, the output torque of the engine 2 and the output torque of the second motor/generator MG2 during execution of the power generation amount increase control will be described. Note that a rotation direction of the engine 2 is indicated by an arrow R in the drawing. During the power generation amount increase control, the first motor/generator MG1 is controlled such that a load torque $T_{mg1}$ is applied to the engine 2, or in other words such that the load torque $T_{mg1}$ is generated in the wound rotor 13. As shown in the drawing, the load torque $T_{mg1}$ is a force generated in a direction of an arrow L, which is an opposite direction to the rotation direction of the engine 2. During the power generation amount increase control, as described above, the output of the engine 2 is increased so that the rotation speed of the engine 2 exhibits substantially no variation. Therefore, a reaction torque $T_r$ of an identical magnitude to the load torque $T_{mg1}$ is output from the engine 2 in an opposite orientation to the load torque $T_{mg1}$. Furthermore, as described above, a plurality of accessories are connected to the output shaft 2a of the engine 2. Therefore, an accessory driving torque $T_{ac}$ for driving these accessories engine 2 is output from the engine 2. Hence, the engine 2 outputs torque $T_e$ serving as a sum of the reaction torque $T_r$ and the accessory driving torque $T_{ac}$.

In the first motor/generator MG1, when the load torque $T_{mg1}$ is generated in the wound rotor 13, torque $T_{mg1}'$ of an identical magnitude to the torque $T_{mg1}$ is generated in the magnet rotor 14 in the direction of the arrow R. As described above, the power generation amount of the second motor/generator MG2 is increased so that the variation in the output torque of the engine 2, or in other words the torque $T_{mg1}'$, is not applied to the drive wheels 5. Hence, the power generation amount of the second motor/generator MG2 is increased such that a reaction torque $T_r'$ of an identical magnitude to the torque $T_{mg1}'$ is generated in the magnet rotor 14 in an opposite orientation to the torque $T_{mg1}'$. Note that when regenerative power generation is underway, torque that rotates in the direction of the arrow R in the drawing is applied to the magnet rotor 14 from the drive wheels 5. Hence, the power generation amount of the second motor/generator MG2 is controlled such that a regenerative power generation torque $T_{re}$ is generated in the magnet rotor 14 in the direction of the arrow L against the torque from the drive wheels 5. As a result, the second motor/generator MG2 generates torque $T_{mg2}$ serving as a sum of the reaction torque $T_r'$ and the regenerative power generation torque $T_{re}$.

As shown in the drawing, the load torque $T_{mg1}$ applied to the engine 2 from the first motor/generator MG1 is canceled out by the reaction torque $T_r$ of the engine 2. Further, the torque $T_{mg1}'$ generated in the magnet rotor 14 is canceled out by the reaction torque $T_r'$ generated by the increase in the power generation amount of the second motor/generator MG2. Since the torque is thus counterbalanced, a braking force of the drive wheels 5 does not vary even when the output torque of the engine 2 increases.

As described above, regenerative power generation is executed when the vehicle 1A is decelerating, traveling on a downhill slope, and so on. In such cases, the drive wheels 5 do not have to be driven by the engine 2. The engine 2 therefore performs an idling operation. Note that an idling operation is an operation performed in a conventional operating condition where the engine 2 outputs the accessory driving torque Tac to drive the accessories or outputs torque required for a warm-up operation or a self-sustaining operation. As is commonly recognized, a thermal efficiency of the engine 2 varies in accordance with the rotation speed of the engine 2 and the torque of the engine 2. When substantially no torque is output from the engine 2, the thermal efficiency of the engine 2 decreases. When the torque of the engine 2 increases, the thermal efficiency of the engine 2 also increases. During an idling operation, substantially no torque is output from the engine 2, and therefore the thermal efficiency of the engine 2 is low. By executing the power generation amount increase control at this time, the load torque is applied to the engine 2, and therefore the torque of the engine 2 increases. As a result, the thermal efficiency of the engine 2 increases. Further, the torque output from the engine 2 is converted into electricity by the second motor/generator MG2 and charged to the battery 7. Hence, when the power generation amount increase control is executed, the thermal efficiency of the engine 2 increases, and therefore the power generation amount can be increased using a small amount of fuel.

When the power generation amount increase control is executed, an amount of fuel supplied to the engine 2 increases, leading to an increase in the output of the engine 2. At this time, a ratio between the increase in the fuel supply amount and the increase in the output of the engine 2, or in other words the thermal efficiency (also referred to hereafter as an apparent thermal efficiency) of the increase in output obtained by executing the power generation amount increase control is greater than the thermal efficiency of the engine 2 while the power generation amount increase control is underway. A reason for this will be described using mathematical formulae. Note that in the following formulae, the output of the engine 2 and the thermal efficiency of the engine 2 prior to execution of the power generation amount increase control are denoted by P and $\eta 1$, respectively. Further, the output of the engine 2 and the thermal efficiency of the engine 2 while the power generation amount increase control is underway are denoted by P+$\Delta$P and $\eta 2$, respectively. An increase $\Delta$Q in the amount of fuel supplied to the engine 2 occurring when the power generation amount increase control is executed can be expressed by Equation (1) shown below.

$$\Delta Q = (P + \Delta P)/\eta 2 - P/\eta 1 \quad (1)$$

An apparent thermal efficiency $\eta$ap takes a value obtained by dividing the increase $\Delta$P in the output of the engine 2 by the increase $\Delta$Q in the fuel amount, and can therefore be expressed by Equation (2) shown below. Note that in Equation (2), $\Delta$P/P is denoted by $\alpha$ and $\eta 2/\eta 1$ is denoted by B.

$$\eta ap = \Delta P / \Delta Q \quad (2)$$
$$= \alpha \times P / [(1 + \alpha)P/\eta 2 - P \times B/\eta 2]$$
$$= [\alpha/(1 + \alpha - B)] \times \eta 2$$
$$= [1/\{1 - (B-1)/\alpha\}] \times \eta 2$$

As described above, the thermal efficiency $\eta 1$ of the engine 2 prior to execution of the power generation amount increase control is smaller than the thermal efficiency $\eta 2$ of the engine 2 while the power generation amount increase control is underway. Therefore, B takes a larger value than 1. In this case, the value of $[1/\{1-(B-1)/\alpha\}]$ in Equation (2) is larger than 1. Hence, the apparent thermal efficiency $\eta$ap is larger than the thermal efficiency $\eta 2$ of the engine 2 while the power generation amount increase control is underway.

An increase $\Delta$PE in the power generation amount obtained by executing the power generation amount increase control can be expressed by Equation (3) shown below. Note that in the following equation, the torque of the first motor/generator MG1 is denoted by Tmg1, a rotation speed of the first motor/generator MG1 is denoted by N1, and an efficiency of the first motor/generator MG1 is denoted by $\eta$mg1. Further, a rotation speed of the second motor/generator MG2 is denoted by N2, and an efficiency of the second motor/generator MG2 is denoted by $\eta$mg2. An increase in the torque of the second motor/generator MG2 obtained by executing the power generation amount increase control is denoted by $\Delta$Tmg2.

$$\Delta PE = \Delta Tmg2 \times N2 \times \eta mg2 - Tmg1 \times N1/\eta mg1 \quad (3)$$

The increase $\Delta$PE in the power generation amount can be expressed by Approximation (4) shown below using the increase in the torque of the engine 2 obtained by executing the power generation amount increase control, the rotation speed of the engine 2, and an overall efficiency of an electrical system of the vehicle 1A. Note that in Approximation (4), the increase in the torque of the engine 2 obtained by executing the power generation amount increase control is denoted by $\Delta$Te, and the rotation speed of the engine 2 is denoted by Ne. Further, the efficiency of the electrical system of the vehicle 1A is denoted by $\eta$E, and the increase in the output of the engine 2 obtained by executing the power generation amount increase control is denoted by $\Delta$P.

$$\Delta PE \cong [\Delta Te \times N2 - \Delta Te \times (N2 - Ne)] \times \eta E \quad (4)$$
$$= (\Delta Te \times Ne) \times \eta E$$
$$= \Delta P \times \eta E$$

Figure 4:
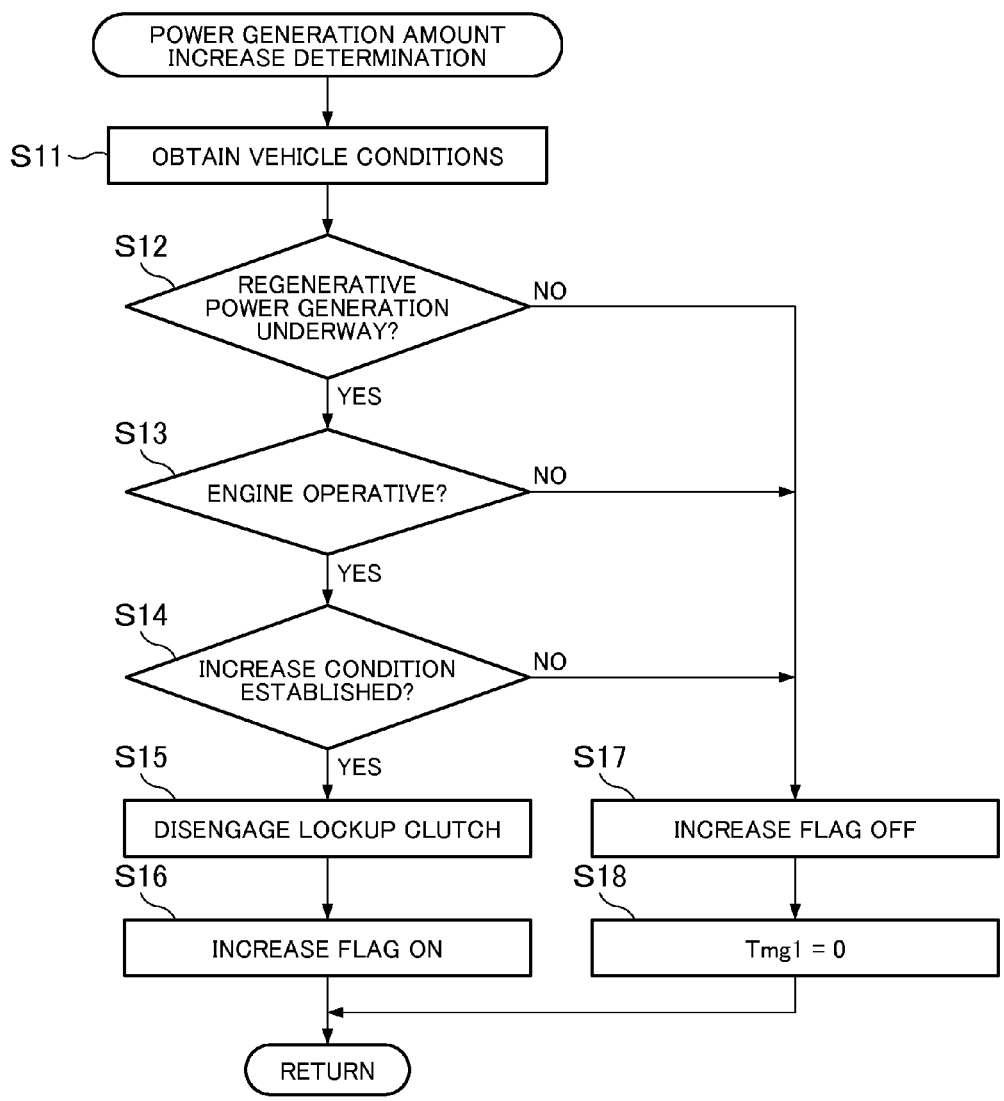
FIG. 4 is a flowchart showing a power generation amount increase determination routine executed by a control apparatus.

Next, a specific method of executing the power generation amount increase control will be described. FIG. 4 shows a power generation amount increase determination routine executed to determine whether or not the control apparatus 30 can execute the power generation amount increase control. This routine is executed repeatedly at predetermined period intervals while the vehicle 1A travels.

In this routine, first, in step S11, the control apparatus 30 obtains conditions of the vehicle 1A. The vehicle speed, the rotation speed of the engine 2, the accelerator depression amount, the storage rate of the battery 7, and so on are obtained as the conditions of the vehicle 1A. Next, in step S12, the control apparatus 30 determines whether or not regenerative power generation is underway in the vehicle 1A. Regenerative power generation in the vehicle 1A is controlled using another routine executed by the control apparatus 30. As described above, regenerative power generation is executed when the vehicle 1A is decelerating or traveling on a downward slope. When regenerative power generation is determined to be underway, the routine advances to step S13, where the control apparatus 30 determines whether or not the engine 2 is operative. When the engine 2 is determined to be operative, the routine advances to step S14, where the control apparatus 30 determines whether or not a predetermined increase condition is established. The increase condition is determined to be established when, for example, the storage rate of the battery 7 is equal to or lower than a predetermined determination value set in advance. In other words, when the storage rate of the battery 7 is higher than the determination value, it is determined that the increase condition is not established. When the increase condition is determined to be established, the routine advances to step S15, where the control apparatus 30 switches the lockup clutch 23 to the disengaged condition. Next, in step S16, the control apparatus 30 switches an increase flag indicating that the power generation amount increase control can be executed ON. The current routine is then terminated.

When, on the other hand, the determination of step S12 is negative, the determination of step S13 is negative, or the determination of step S14 is negative, the routine advances to step S17, where the control apparatus 30 switches the increase flag OFF. Next, in step S18, the control apparatus 30 resets the load torque Tmg1 that is applied to the engine 2 from the first motor/generator MG1 during the power generation amount increase control to zero. The current routine is then terminated. Note that a value of the load torque Tmg1 is stored in the RAM of the control apparatus 30 and used in another routine executed by the control apparatus 30.

Figure 5:
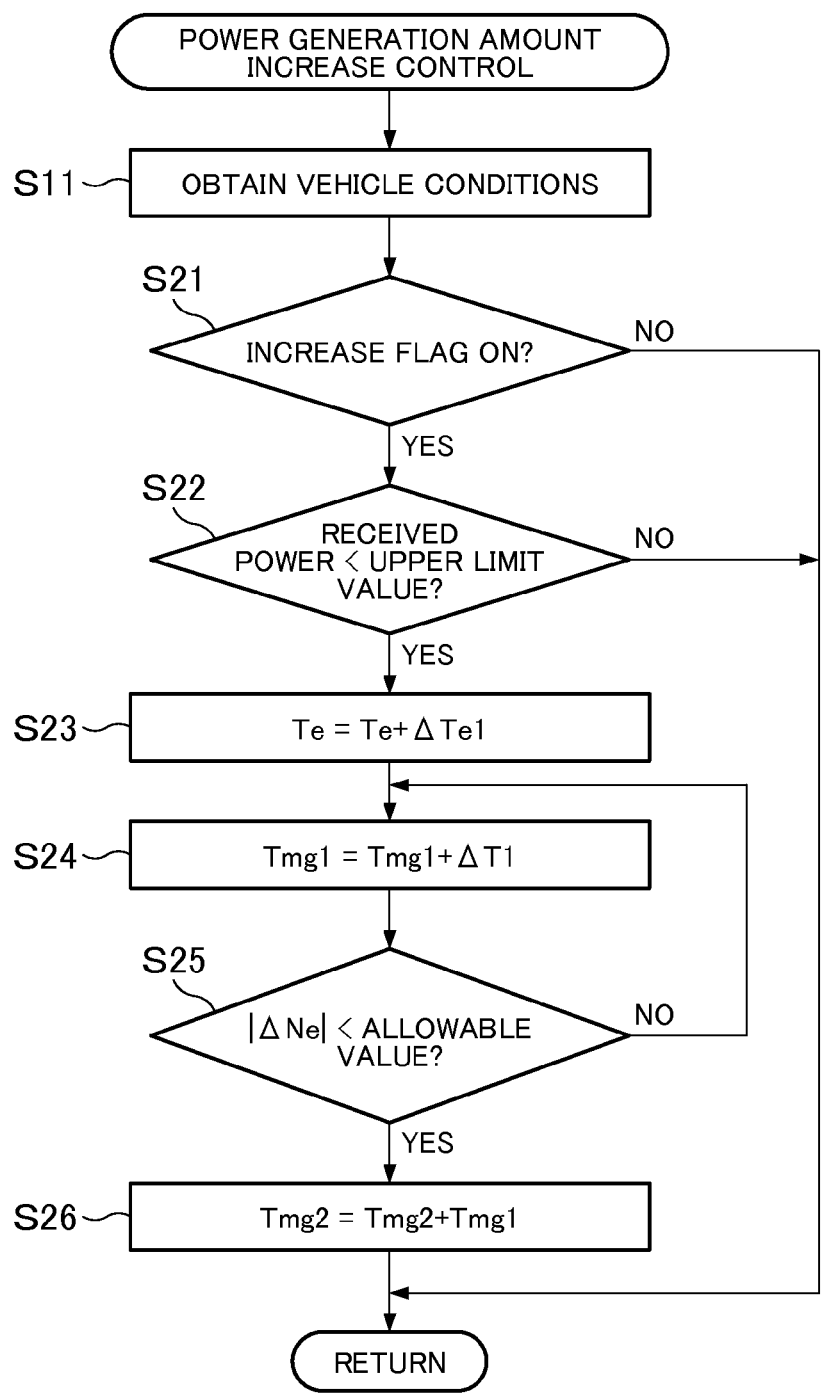
FIG. 5 is a flowchart showing a power generation amount increase control routine executed by the control apparatus.

FIG. 5 shows a routine executed by the control apparatus 30 in order to execute the power generation amount increase control. This control routine is executed repeatedly at predetermined period intervals while the vehicle 1A travels. Note that processes of this control routine that are shared with the routine of FIG. 4 have been allocated identical reference symbols, and description thereof has been omitted.

In this control routine, first, in step S11, the control apparatus 30 obtains the conditions of the vehicle 1A. Next, in step S21, the control apparatus 30 determines whether or not the increase flag is ON. When the increase flag is determined to be OFF, the current control routine is terminated. When the increase flag is determined to be ON, on the other hand, the routine advances to step S22, where the control apparatus 30 determines whether or not an amount of power received by the battery 7 is smaller than a preset upper limit value. As is commonly recognized, a limit value is set in relation to an amount of power that can be charged to the battery 7 per unit time. The upper limit value is set at a slightly smaller value than this limit value. Note that the limit value varies according to a capacity of the battery 7 and so on, and therefore the upper limit value should likewise be set appropriately in accordance with the capacity of the battery 7. When the amount of power received by the battery 7 is determined to equal or exceed the upper limit value, the current control routine is terminated.

When the amount of power received by the battery 7 is determined to be smaller than the upper limit value, on the other hand, the routine advances to step S23, where the control apparatus 30 controls the engine 2 such that the output torque Te of the engine 2 is increased by a preset increase torque ΔTe1. Note that the increase torque ΔTe1 may be set appropriately in accordance with a rated output of the first motor/generator MG1 and the like such that a rapid increase in the rotation speed of the engine 2 can be prevented by the first motor/generator MG1. Next, in step S24, the control apparatus 30 controls the first motor/generator MG1 such that the load torque Tmg1 applied to the engine 2 from the first motor/generator MG1 is increased by a preset increase torque ΔT1. As described above, the load torque Tmg1 is reset to 0 when the increase flag is switched OFF. Therefore, the load torque Tmg1 initially output from the first motor/generator MG1 corresponds to the increase torque ΔT1. Note that the increase torque ΔT1 should be set appropriately so that the rotation speed of the engine 2 does not decrease rapidly, leading to instability in the operating conditions of the engine 2.

Next, in step S25, the control apparatus 30 determines whether or not an absolute value of a variation amount ΔNe in the rotation speed of the engine 2 before and after the increase in the output torque Te is smaller than a preset allowable value. A rotation speed at which a driver does not experience an unpleasant sensation even if the rotation speed of the engine 2 increases as the vehicle 1A decelerates or the like is set as the allowable value. When the absolute value of the variation amount ΔNe is determined to equal or exceed the allowable value, the routine returns to step S24, where the control apparatus 30 executes steps S24 and S25 repeatedly until the absolute value of the variation width ΔNe falls below the allowable value. When the absolute value of the variation amount ΔNe is determined to be smaller than the allowable value, on the other hand, the routine advances to step S26, where the control apparatus 30 controls the second motor/generator MG2 such that the torque Tmg2 of the second motor/generator MG2 is increased by the load torque Tmg1. The current control routine is then terminated.

Figure 6:
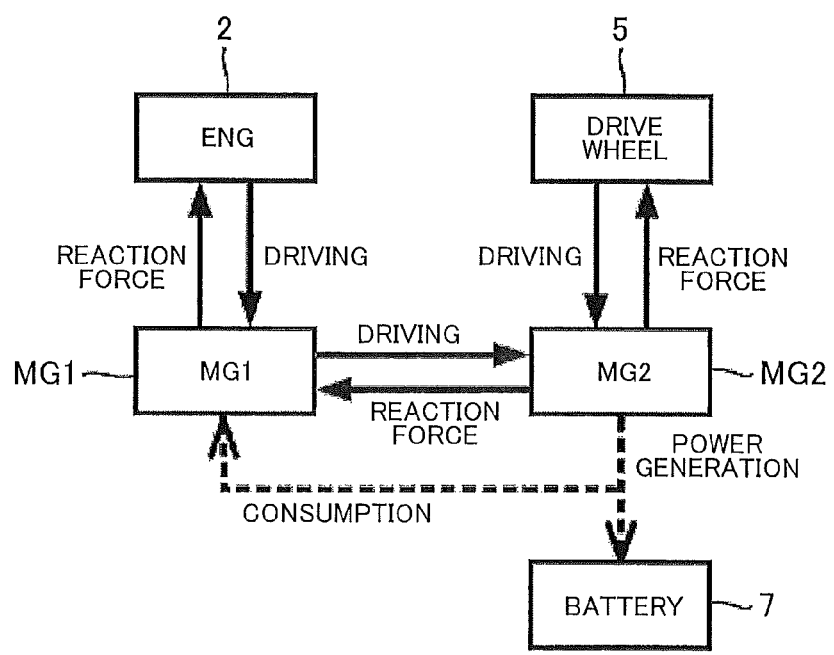
FIG. 6 is a view showing a flow of power and a flow of electricity through the vehicle during execution of the power generation amount increase control according to the first embodiment.

FIG. 6 shows a flow of power and a flow of electricity through the vehicle 1A during execution of the power generation amount increase control according to the first embodiment. Note that in this drawing, "MG1" and "MG2" respectively denote the first motor/generator MG1 and the second motor/generator MG2. Further, "ENG" denotes the engine 2. Regenerative power generation is executed likewise while the power generation amount increase control is underway. Therefore, a driving force is applied to the second motor/generator MG2 from the drive wheels 5, and a reaction force to the driving force is applied to the drive wheels 5 from the second motor/generator MG2. As a result, regenerative braking is executed.

In the first embodiment, as described above, the torque of the engine 2 is increased first. Accordingly, a driving force is applied to the first motor/generator MG1 from the engine 2. Further, a load torque (a reaction force) relative to the driving force is applied from the first motor/generator MG1. A driving force is also applied to the second motor/generator MG2 from the first motor/generator MG1, and therefore a reaction force to this driving force is applied to the first motor/generator MG1 from the second motor/generator MG2.

While the power generation amount increase control is underway, regenerative power generation is performed by the second motor/generator MG2, and therefore electricity is generated. A part of the electricity generated by the second motor/generator MG2 is supplied as is to the first motor/generator MG1 via the inverter 6. The first motor/generator MG1 uses this electricity to apply the load torque to the engine 2. In other words, during the power generation amount increase control, the first motor/generator MG1 is driven by a part of the electricity generated by the second motor/generator MG2. The remainder of the electricity generated by the second motor/generator MG2 is charged to the battery 7.

In the first embodiment, as described above, the power generation amount increase control is executed when regenerative power generation is underway and the engine 2 is operative. In so doing, the thermal efficiency of the engine 2 can be improved, and therefore the power generation amount can be increased using a small amount of fuel. As a result, an improvement in fuel efficiency is achieved. Moreover, the energy efficiency of the vehicle 1A can be improved. According to the first embodiment, the torque of the engine 2 is increased first when the power generation amount increase control is executed. In so doing, an amount of heat generated by the engine 2 can be increased quickly. When the engine 2 is warmed up, therefore, a warm-up operation can be completed quickly.

During execution of the power generation amount increase control, as described above, torque is applied to the engine 2 from the first motor/generator MG1. Accordingly, the first motor/generator MG1 corresponds to a motor of the invention. Further, power is generated by the second motor/generator MG2, and therefore the second motor/generator MG2 corresponds to a generator of the invention. The control apparatus 30, meanwhile, by executing the routines shown in FIGS. 4 and 5, functions as power generation amount increasing means of the invention. Note that the processing of step S14 in the routine of FIG. 4 may be omitted.

Second Embodiment

Figure 7:
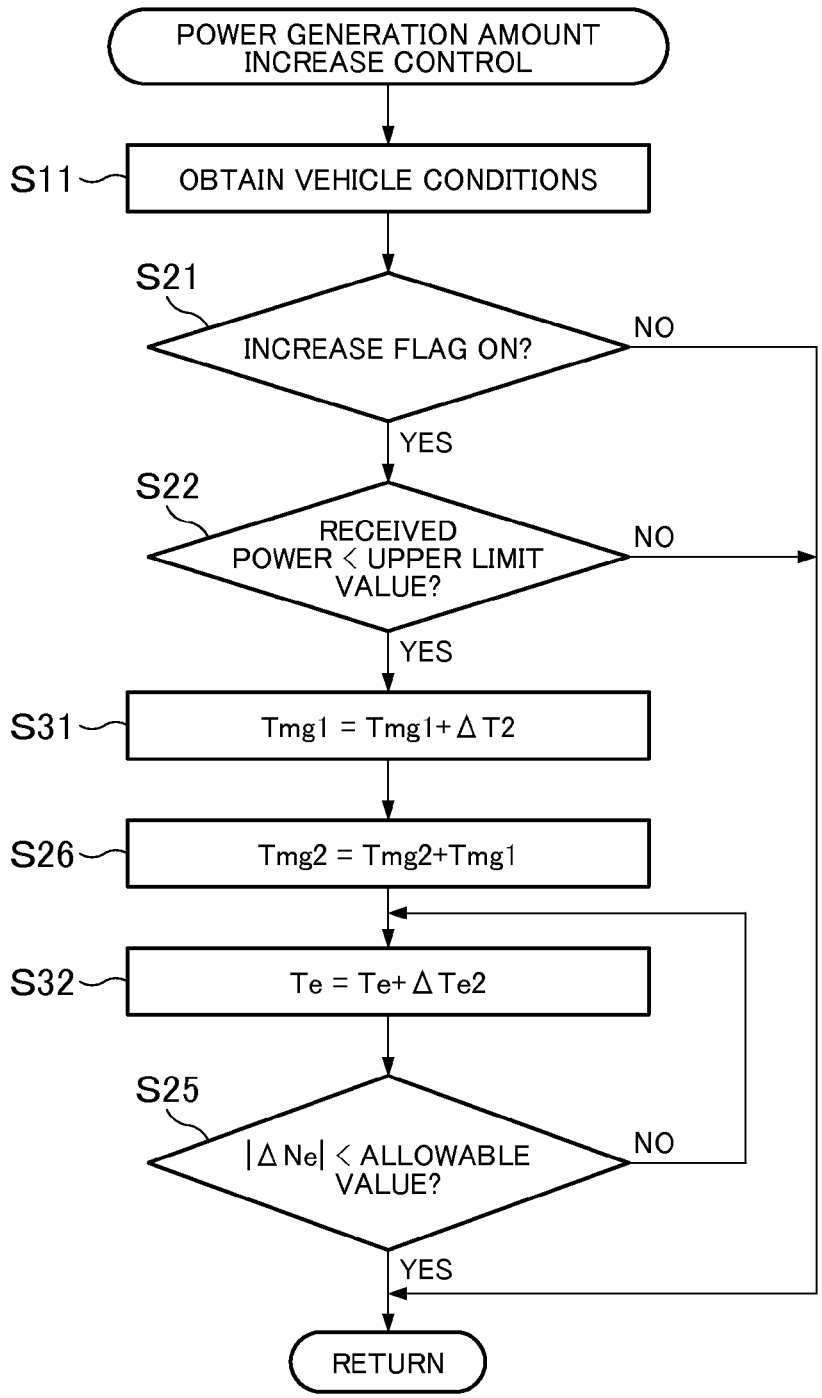
FIG. 7 is a flowchart showing a power generation amount increase control routine executed by a control apparatus of a power generation control apparatus according to a second embodiment of the invention.
Figure 8:
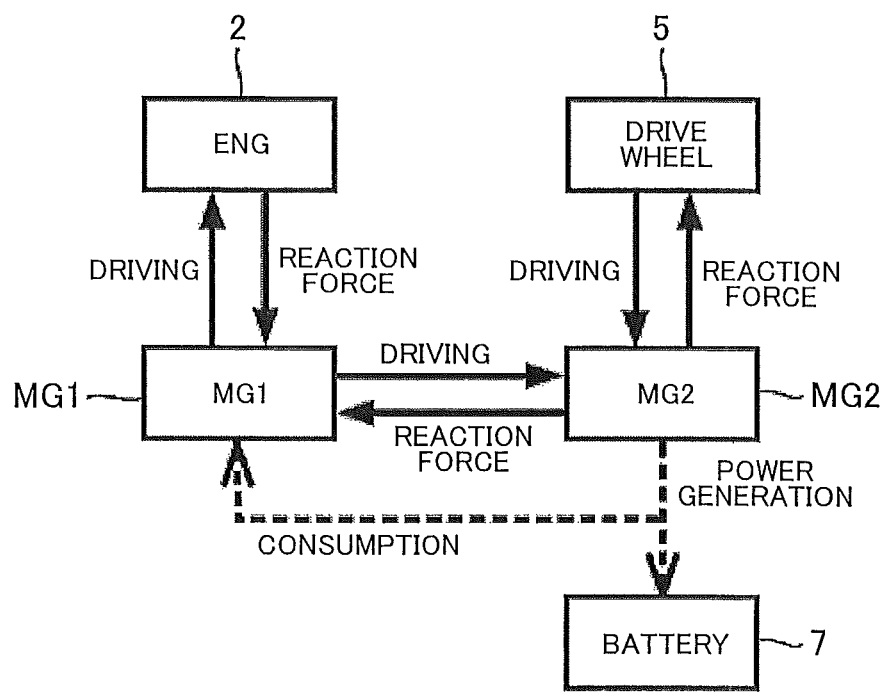
FIG. 8 is a view showing a flow of power and a flow of electricity through the vehicle during execution of the power generation amount increase control according to the second embodiment.

Referring to FIGS. 7 and 8, a power generation control apparatus according to a second embodiment will be described. In this embodiment, the power generation amount increase control routine executed by the control apparatus 30 differs from the first embodiment, but in all other respects, the second embodiment is identical to the first embodiment. Likewise in this embodiment, therefore, FIG. 1 will be referred to in relation to the vehicle 1A. Furthermore, likewise in this embodiment, the control apparatus 30 executes the power generation amount increase determination routine of FIG. 4 repeatedly at predetermined period intervals while the vehicle 1A travels.

FIG. 7 shows the power generation amount increase control routine executed by the control apparatus 30 in this embodiment. Note that processes shown in FIG. 7 that are shared with the routines of FIGS. 4 and 5 have been allocated identical reference symbols, and description thereof has been omitted. This control routine is likewise executed repeatedly at predetermined period intervals while the vehicle 1A travels.

In this control routine, the control apparatus 30 performs identical processing to that of the control routine of FIG. 5 up to step S22. When the determination of step S22 is affirmative, the routine advances to step S31, where the control apparatus 30 controls the first motor/generator MG1 such that the load torque Tmg1 applied to the engine 2 from the first motor/generator MG1 is increased by a preset increase torque ΔT2. Note that the increase torque ΔT2 should be set appropriately so that the rotation speed of the engine 2 does not decrease rapidly, leading to instability in the operating conditions of the engine 2. Next, in step S26, the control apparatus 30 controls the second motor/generator MG2 such that the torque Tmg2 of the second motor/generator MG2 is increased by the load torque Tmg1.

Next, in step S32, the control apparatus 30 controls the engine 2 such that the output torque Te of the engine 2 is increased by a preset increase torque ΔTe2. Note that the increase torque ΔTe2 should be set appropriately so that the load torque Tmg1 applied from the first motor/generator MG1 does not cause instability in the operating conditions of the engine 2. Next, in step S25, the control apparatus 30 determines whether or not the absolute value of the variation amount ΔNe in the rotation speed of the engine 2 before and after the increase in the output torque Te is smaller than the preset allowable value. When the absolute value of the variation amount ΔNe is determined to equal or exceed the allowable value, the routine returns to step S32, where the control apparatus 30 executes steps S32 and S25 repeatedly until the absolute value of the variation amount ΔNe falls below the allowable value. When the absolute value of the variation amount ΔNe is determined to be smaller than the allowable value, on the other hand, the current control routine is terminated.

FIG. 8 shows a flow of power and a flow of electricity through the vehicle 1A during execution of the power generation amount increase control according to the second embodiment. Note that parts of the drawing that are shared with FIG. 6 have been omitted. During the power generation amount increase control according to the second embodiment, first, the load torque Tmg1 of the first motor/generator MG1 is increased. Accordingly, a driving force is applied respectively to the engine 2 and the second motor/generator MG2 from the first motor/generator MG1. A reaction force to the applied driving force is then applied to the first motor/generator MG1 from the engine 2 and the second motor/generator MG2. In all other respects, FIG. 8 is identical to FIG. 6.

Likewise in the second embodiment, as described above, the power generation amount increase control is executed when regenerative power generation is underway and the engine 2 is operative, and therefore the thermal efficiency of the engine 2 can be improved. Accordingly, the power generation amount can be increased using a small amount of fuel, and as a result, an improvement in fuel efficiency can be achieved. Hence, the energy efficiency of the vehicle 1A can be improved. According to the second embodiment, when the power generation amount increase control is executed, first, the load torque of the first motor/generator MG1 is increased. As is commonly recognized, when the torque or the rotation speed of a motor/generator is modified, the motor/generator can be adjusted to the modified value more quickly than an engine. In this embodiment, the torque of the first motor/generator MG1 is controlled first during the power generation amount increase control, and therefore the power generation amount of the second motor/generator MG2 can be increased quickly.

Note that in the flowchart of FIG. 7, described above, the torque of the engine 2 is modified after modifying the torque of the second motor/generator MG2. However, a sequence in which the second motor/generator MG2 and the engine 2 are controlled is not limited to this sequence, and instead, for example, the torque of the second motor/generator MG2 and the torque of the engine 2 may be modified in parallel after modifying the torque of the first motor/generator MG1.

Third Embodiment

Figure 9:
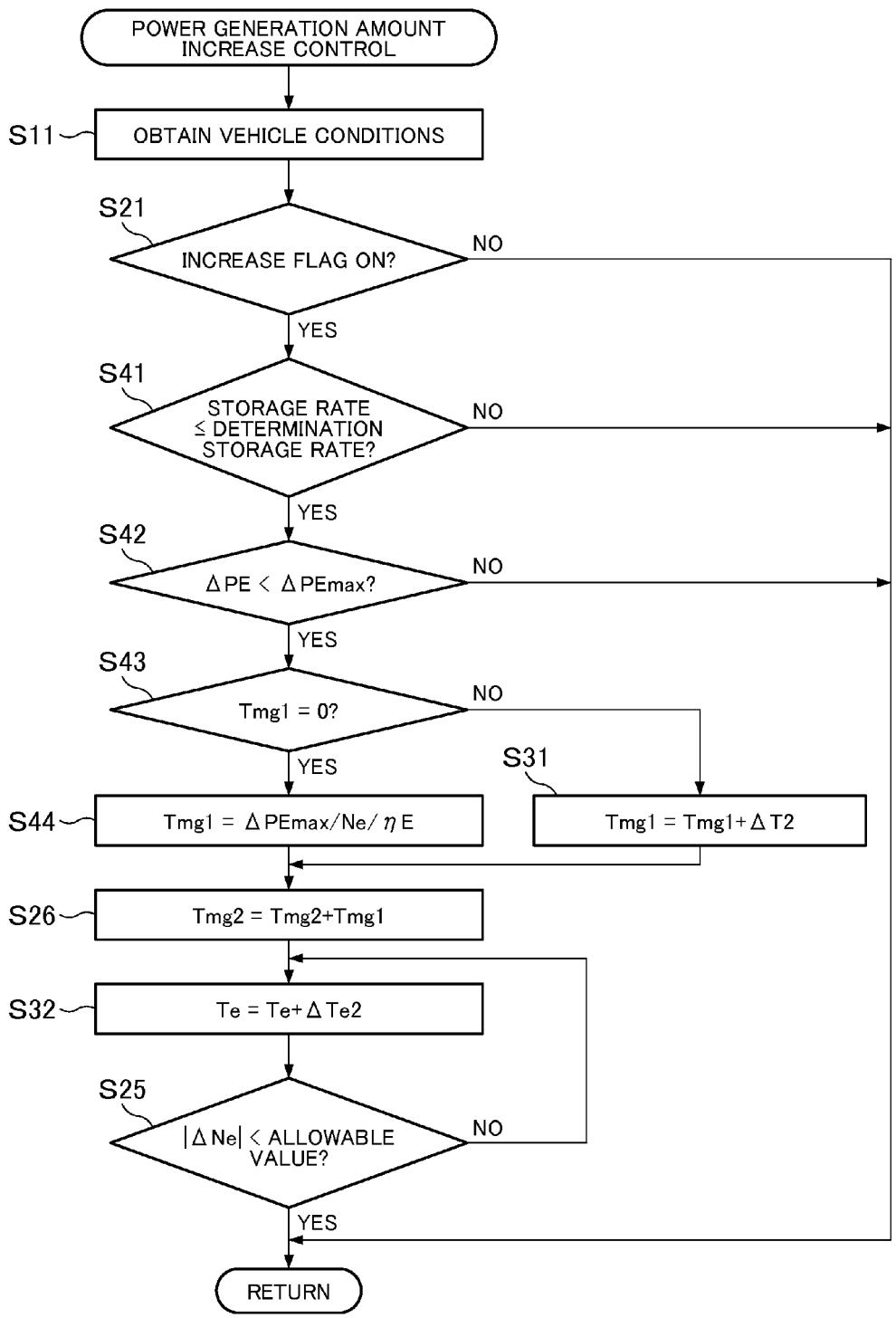
FIG. 9 is a flowchart showing a power generation amount increase control routine executed by a control apparatus of a power generation control apparatus according to a third embodiment of the invention.

Referring to FIG. 9, a power generation control apparatus according to a third embodiment will be described. In this embodiment, the power generation amount increase control routine executed by the control apparatus 30 differs from the first embodiment, but in all other respects, the third embodiment is identical to the first embodiment. Likewise in this embodiment, therefore, FIG. 1 will be referred to in relation to the vehicle 1A. Furthermore, likewise in this embodiment, the control apparatus 30 executes the power generation amount increase determination routine of FIG. 4 repeatedly at predetermined period intervals while the vehicle 1A travels.

FIG. 9 shows the power generation amount increase control routine executed by the control apparatus 30 in this embodiment. Note that processes shown in FIG. 9 that are shared with the routine of FIG. 4, 5, or 7 have been allocated identical reference symbols, and description thereof has been omitted. This control routine is likewise executed repeatedly at predetermined period intervals while the vehicle 1A travels.

In this control routine, the control apparatus 30 performs identical processing to that of the control routine of FIG. 5 up to step S21. When the increase flag is determined to be ON in step S21, the routine advances to step S41, where the control apparatus 30 determines whether or not the storage rate of the battery 7 is equal to or smaller than a preset determination storage rate. When the battery 7 is fully charged, the battery 7 cannot be charged, and therefore regenerative power generation cannot be executed. Hence, a smaller storage rate than a maximum storage rate, for example 80% or the like, at which the battery 7 can receive electricity generated when regenerative power generation is next executed is set as the determination storage rate. Note that this storage rate varies according to the capacity of the battery 7 and so on, and should therefore be set appropriately in accordance with the capacity of the battery 7 and so on. When the storage rate is determined to be larger than the determination storage rate, the current control routine is terminated.

When the storage rate is determined to be equal to or smaller than the determination storage rate, on the other hand, the routine advances to step S42, where the control apparatus 30 determines whether or not a power generation amount (also referred to hereafter as an increased power generation amount) $\Delta PE$ increased by the power generation amount increase control is smaller than a preset increase upper limit value $\Delta PEmax$. When the increased power generation amount $\Delta PE$ is large, the load of the engine 2 may become excessive, leading to a reduction in the fuel efficiency of the vehicle 1A and an increase in an amount of nitrogen oxide, or in other words so-called NOx, discharged from the engine 2. The increase upper limit value $\Delta PEmax$ should therefore be set appropriately in consideration of the fuel efficiency of the vehicle 1A, the amount of NOx discharged from the engine 2, and so on. When the increased power generation amount $\Delta PE$ is determined to equal or exceed the increase upper limit value $\Delta PEmax$, the current control routine is terminated.

When the increased power generation amount $\Delta PE$ is determined to be smaller than the increase upper limit value $\Delta PEmax$, on the other hand, the routine advances to step S43, where the control apparatus 30 determines whether or not the load torque Tmg1 of the first motor/generator MG1 is 0. When the load torque Tmg1 is determined to be 0, the routine advances to step S44, where the control apparatus 30 sets, as the load torque Tmg1, a value obtained by dividing the increase upper limit value $\Delta PEmax$ by the rotation speed of the engine 2 and the efficiency $\eta E$ of the electrical system of the vehicle 1A. Further, in this processing, the control apparatus 30 controls the first motor/generator MG1 such that the set load torque Tmg1 is applied to the engine 2 from the first motor/generator MG1. When the load torque Tmg1 is determined not to be 0, on the other hand, the routine advances to step S31, where the control apparatus 30 controls the first motor/generator MG1 such that the load torque Tmg1 applied to the engine 2 from the first motor/generator MG1 is increased by the preset increase torque $\Delta T2$.

After the first motor/generator MG1 is controlled in step S44 or step S31, the routine advances to step S26. Thereafter, the control apparatus 30 performs identical processing to that of the control routine shown in FIG. 7.

Likewise in the third embodiment, as described above, the power generation amount increase control is executed when regenerative power generation is underway and the engine 2 is operative, and therefore the thermal efficiency of the engine 2 can be improved. Accordingly, the power generation amount can be increased using a small amount of fuel, and as a result, an improvement in fuel efficiency can be achieved. Hence, the energy efficiency of the vehicle 1A can be improved. Further, in the third embodiment, the power generation amount increase operation is interrupted when the storage rate of the battery 7 is larger than the determination storage rate, and therefore the battery 7 can be prevented from being fully charged. Moreover, the increase upper limit value $\Delta PEmax$ is provided in relation to the increased power generation amount $\Delta PE$, and therefore the battery 7 can be prevented from being fully charged even more reliably. Furthermore, by providing an upper limit to the increased power generation amount $\Delta PE$, an excessive load can be prevented from being applied to the engine 2.

Note that in this embodiment, similarly to the second embodiment, the torque of the second motor/generator MG2 and the torque of the engine 2 may be modified in parallel after modifying the torque of the first motor/generator MG1.

Fourth Embodiment

Figure 10:
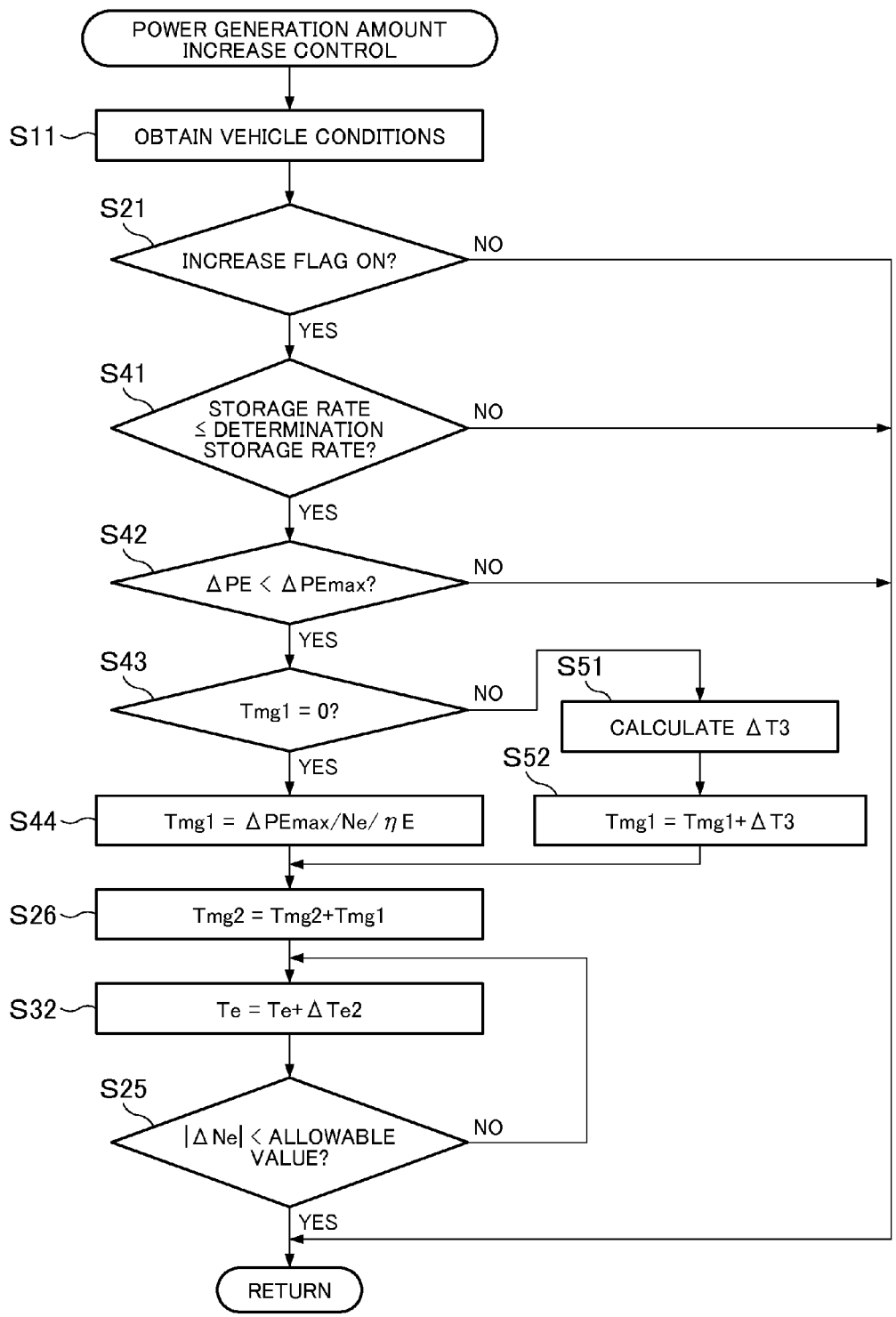
FIG. 10 is a flowchart showing a power generation amount increase control routine executed by a control apparatus of a power generation control apparatus according to a fourth embodiment of the invention.

Referring to FIG. 10, a power generation control apparatus according to a fourth embodiment will be described. In this embodiment, the power generation amount increase control routine executed by the control apparatus 30 differs from the first embodiment, but in all other respects, the fourth embodiment is identical to the first embodiment. Likewise in this embodiment, therefore, FIG. 1 will be referred to in relation to the vehicle 1A. Furthermore, likewise in this embodiment, the control apparatus 30 executes the power generation amount increase determination routine of FIG. 4 repeatedly at predetermined period intervals while the vehicle 1A travels.

FIG. 10 shows the power generation amount increase control routine executed by the control apparatus 30 in this embodiment. Note that processes shown in FIG. 10 that are shared with the routine of FIG. 4, 5, 7, or 9 have been allocated identical reference symbols, and description thereof has been omitted. This control routine is likewise executed repeatedly at predetermined period intervals while the vehicle 1A travels. In this embodiment, as is evident from FIG. 10, steps S51 and S52 are provided in place of step S31 in FIG. 9. Otherwise, the control routine shown in FIG. 10 is identical to the control routine of FIG. 9.

Figure 11:
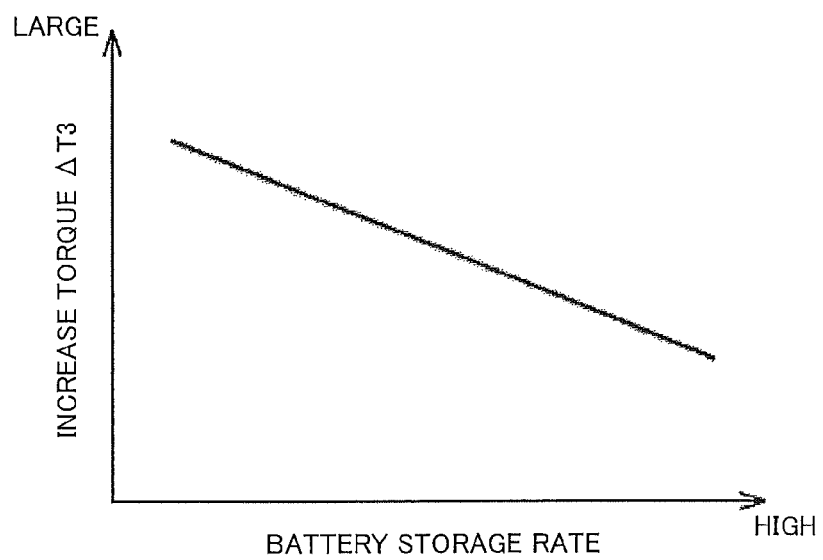
FIG. 11 is a view showing an example of a relationship between a storage rate of a battery and an increase torque.

In the control routine of FIG. 10, the control apparatus 30 performs identical processing to that of the control routine shown in FIG. 9 up to step S43. When the determination of step S43 is affirmative, the routine advances to step S44, whereupon the control apparatus 30 likewise performs identical processing to that of the control routine of FIG. 9. When the determination of step S43 is negative, on the other hand, the routine advances to step S51, where the control apparatus 30 calculates an increase torque ΔT3 on the basis of the storage rate of the battery 7. The increase torque ΔT3 may be calculated by referring to a map, an example of which is shown in FIG. 11. FIG. 11 shows a relationship between the storage rate of the battery 7 and the increase torque ΔT3. As shown in the drawing, the increase torque ΔT3 decreases as the storage rate of the battery 7 increases. Note that this relationship may be determined in advance by experiments, numerical calculations, or the like, and then stored as a map in the ROM of the control apparatus 30. Next, in step S52, the control apparatus 30 controls the first motor/generator MG1 such that the load torque Tmg1 applied to the engine 2 from the first motor/generator MG1 is increased by the calculated increase torque ΔT3. The routine then advances to step S26, whereupon the control apparatus 30 likewise performs identical processing to that of the control routine of FIG. 9.

Likewise in the fourth embodiment, as described above, the power generation amount increase control is executed when regenerative power generation is underway and the engine 2 is operative, and therefore the thermal efficiency of the engine 2 can be improved. Moreover, improvements in fuel efficiency and the energy efficiency of the vehicle 1A can be achieved. Furthermore, in the fourth embodiment, similarly to the third embodiment, the power generation amount increase operation is interrupted when the storage rate of the battery 7 is larger than the determination storage rate, and therefore the battery 7 can be prevented from being fully charged. Further, in the fourth embodiment, the increase torque ΔT3 decreases as the storage rate of the battery 7 increases, and therefore the battery 7 can be prevented even more reliably from being fully charged.

Note that in this embodiment, similarly to the second embodiment, the torque of the second motor/generator MG2 and the torque of the engine 2 may be modified in parallel after modifying the torque of the first motor/generator MG1.

Figure 12:
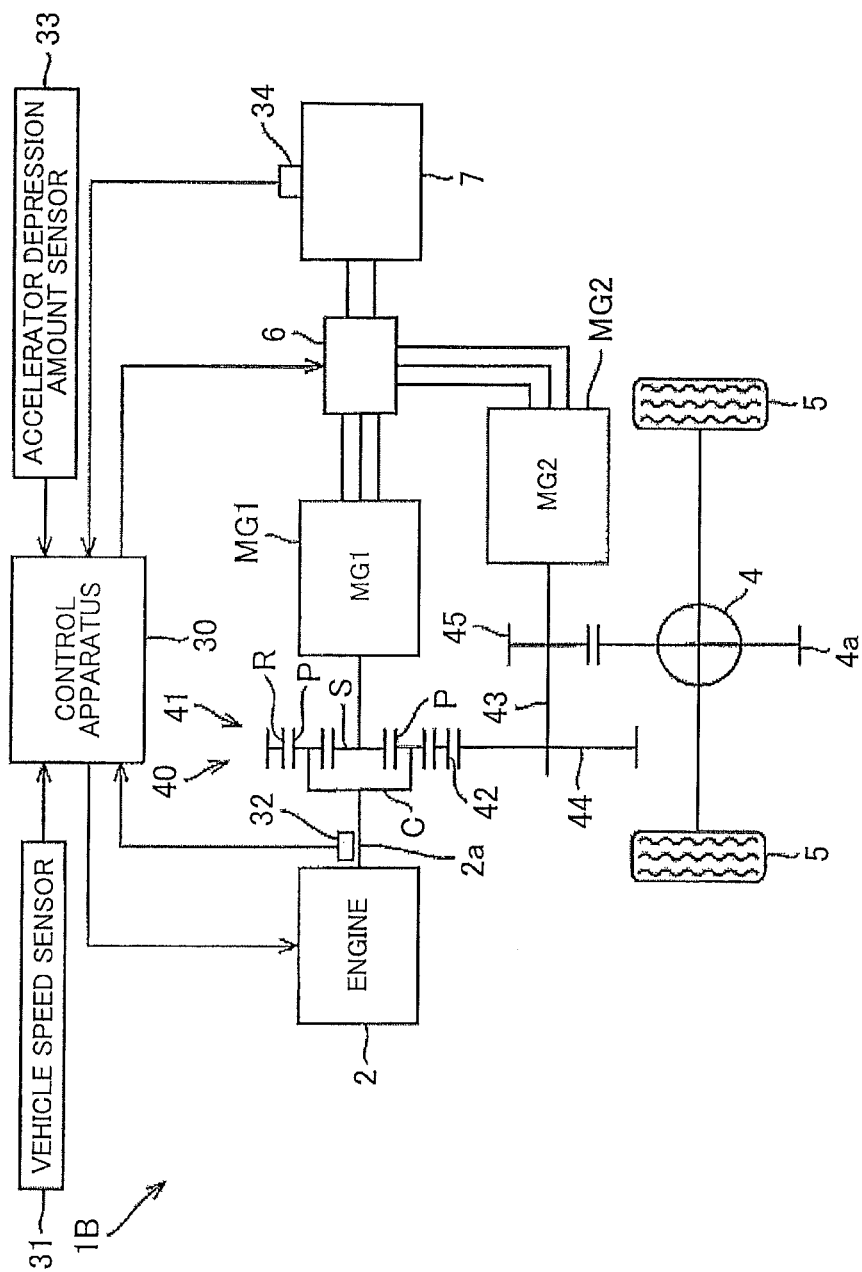
FIG. 12 is a schematic view showing another hybrid vehicle to which the power generation control apparatus according to the invention is applied.

The invention is not limited to the embodiments described above, and may be implemented in various other embodiments. For example, the hybrid vehicle to which the invention is applied is not limited to the vehicle described in the above embodiments, and may be a hybrid vehicle 1B shown schematically in FIG. 12. Note that parts of FIG. 12 that are shared with FIG. 1 have been allocated identical reference symbols, and description thereof has been omitted.

As shown in the drawing, in the vehicle 1B, the first motor/generator MG1 and the second motor/generator MG2 are provided separately. The first motor/generator MG1 and the engine 2 are connected to a power distribution mechanism 40. The power distribution mechanism 40 includes a single pinion type planetary gear mechanism 41. The planetary gear mechanism 41 includes a sun gear S serving as an external gear, a ring gear R serving as an internal gear disposed coaxially with the sun gear S, and a carrier C that holds a pinion gear P, which meshes with the gears S, R, to be capable of rotating and revolving around the sun gear S. The engine 2 is connected to the carrier C so as to rotate integrally therewith. The first motor/generator MG1 is connected to the sun gear S so as to rotate integrally therewith. A drive gear 42 is attached to an outer periphery of the ring gear R so as to rotate integrally therewith. The drive gear 42 meshes with a driven gear 44 provided on an output shaft 43 serving as an output member. An output gear 45 is provided on the output shaft 43. The output gear 45 meshes with a ring gear 4a provided on a case of the differential mechanism 4. The second motor/generator MG2 is connected to the output shaft 43 so as to rotate integrally therewith.

In the vehicle 1B, the second motor/generator MG2 is caused to function as a generator when the 1B decelerates, travels on a downhill slope, or the like. The second motor/generator MG2 is driven to rotate by power input into the output shaft 43 from the drive wheels 5, and as a result, the second motor/generator MG2 executes regenerative power generation.

Further, likewise in the vehicle 1B, while regenerative power generation is underway, torque can be output from the first motor/generator MG1 such that a load can be applied to the engine 2. Hence, by increasing the torque of the engine 2, the power generation amount of the second motor/generator MG2 can be increased. Therefore, the control apparatus 30 of the vehicle 1B also executes the routine of FIG. 4 and the respective power generation amount increase control routines of the above embodiments. Thus, the power generation amount increase control is executed likewise on the vehicle 1B. In this case, the thermal efficiency of the engine 2 can be improved, and therefore the power generation amount can be increased using a small amount of fuel. As a result, an improvement in fuel efficiency can be achieved. Moreover, the energy efficiency of the vehicle 1B can be improved.

Likewise in the vehicle 1B, the first motor/generator MG1 corresponds to the motor of the invention and the second motor/generator MG2 corresponds to the generator of the invention.

In the embodiments described above, the operation of the first motor/generator is controlled such that substantially all of the output torque of the engine, excluding the accessory driving torque, is transmitted to the second motor/generator, but a control method applied to the first motor/generator is not limited to this method. For example, the operation of the first motor/generator may be controlled such that a part of the torque obtained by subtracting the accessory driving torque from the output torque of the engine is transmitted to the second motor/generator. In other words, it is sufficient to control the first motor/generator such that at least a part of the output torque of the engine is transmitted to an output member such as the output shaft. Further, the first motor/generator may be provided in any manner as long as the torque output thereby can be applied to an engine, and for example, the first motor/generator may be provided to be capable of applying torque onto a power transmission path between an internal combustion engine and an output shaft.

The invention may be applied favorably to a hybrid vehicle in which an accessory is directly connected to an internal combustion engine. When an idling operation is performed in this type of vehicle, control to stop the internal combustion engine, or in other words idling stop control, cannot be executed. It is therefore necessary to keep the internal combustion engine in an operative condition. By applying the invention to this type of vehicle, a period during which the internal combustion engine is operated in a condition of low thermal efficiency can be shortened, and therefore the invention can be applied favorably. Note that this type of vehicle is a large vehicle, for example.

The invention claimed is:

1. A power generation control apparatus that is applied to a hybrid vehicle including:
   an internal combustion engine;
   an output member to which torque output from the internal combustion engine is transmitted and which is connected to a drive wheel to be capable of power transmission;
   a motor provided to be capable of applying torque output thereby to the internal combustion engine;

a generator connected to the output member; and
a battery that is electrically connected respectively to the motor and the generator, and that executes regenerative power generation using the generator when the output member is driven to rotate by power input from the drive wheel, the power generation control apparatus comprising:
a power generation amount increasing unit that, when the regenerative power generation is underway and the internal combustion engine is operative, controls the internal combustion engine and the motor respectively such that the output torque output from the internal combustion engine is increased above idling torque output from the internal combustion engine during an idling operation by the torque applied thereto from the motor, and increases a power generation amount of the generator such that the torque transmitted to the output member from the internal combustion engine is not applied to the drive wheel,
wherein the hybrid vehicle is provided with a rotating electric machine including:
 a first rotor that includes a plurality of coils and is provided to be capable of rotating about an axis;
 a second rotor that includes a magnet is disposed on an outer periphery of the first rotor to be coaxial with the first rotor, and is provided to be capable of rotating relative to the first rotor; and
 a stator that includes a plurality of coils and is provided on an outer periphery of the second rotor to be coaxial with the first rotor and the second rotor, the first rotor is connected to the internal combustion engine,
 wherein the second rotor is connected to the output member, the motor is constituted by the first rotor and the second rotor, and the generator is constituted by the second rotor and the stator,
 wherein the hybrid vehicle is provided with a clutch unit that can be switched between an engaged condition in which the first rotor and the second rotor rotate integrally and a disengaged condition in which the first rotor and the second rotor are capable of relative rotation, and when the regenerative power generation is underway and the internal combustion engine is operative, the power generation amount increasing unit means switches the clutch unit means to the disengaged condition.

2. The power generation control apparatus according to claim 1, wherein the power generation amount increasing unit means controls the internal combustion engine, the motor, and the generator such that the increase in the power generation amount of the generator increased by increasing the output torque of the internal combustion engine is smaller than a preset upper limit value.

3. The power generation control apparatus according to claim 1, wherein the power generation amount increasing unit controls the internal combustion engine, the motor, and the generator such that the increase in the power generation amount of the generator, which is generated by increasing the output torque of the internal combustion engine, decreases as a storage rate of the battery increases.

4. A power generation control apparatus that is applied to a hybrid vehicle including:
an internal combustion engine;
an output member to which torque output from the internal combustion engine is transmitted and which is connected to a drive wheel to be capable of power transmission;
a motor provided to be capable of applying torque output thereby to the internal combustion engine;
a generator connected to the output member; and
a battery that is electrically connected respectively to the motor and the generator, and that executes regenerative power generation using the generator when the output member is driven to rotate by power input from the drive wheel, the power generation control apparatus comprising:
a power generation amount increasing unit that, when the regenerative power generation is underway and the internal combustion engine is operative, controls the internal combustion engine and the motor respectively such that the output torque output from the internal combustion engine is increased above idling torque output from the internal combustion engine during an idling operation by the torque applied thereto from the motor, and increases a power generation amount of the generator such that the torque transmitted to the output member from the internal combustion engine is not applied to the drive wheel,
wherein when the regenerative power generation is underway and the internal combustion engine is operative, the power generation amount increasing unit first controls the internal combustion engine such that the output torque of the internal combustion engine is increased above the idling torque, then controls the motor such that a variation amount in a rotation speed of the internal combustion engine before and after the output torque of the internal combustion engine is increased by the torque applied to the internal combustion engine from the motor falls below a predetermined allowable value, and then controls the generator such that the increase in the output torque of the internal combustion engine increased by the torque applied thereto from the motor is canceled out by the increase in the power generation amount of the generator.

5. A power generation control apparatus that is applied to a hybrid vehicle including:
an internal combustion engine;
an output member to which torque output from the internal combustion engine is transmitted and which is connected to a drive wheel to be capable of power transmission;
a motor provided to be capable of applying torque output thereby to the internal combustion engine;
a generator connected to the output member; and
a battery that is electrically connected respectively to the motor and the generator, and that executes regenerative power generation using the generator when the output member is driven to rotate by power input from the drive wheel, the power generation control apparatus comprising:
a power generation amount increasing unit that, when the regenerative power generation is underway and the internal combustion engine is operative, controls the internal combustion engine and the motor respectively such that the output torque output from the internal combustion engine is increased above idling torque output from the internal combustion engine during an idling operation by the torque applied thereto from the motor, and increases a power generation amount of the generator such that the torque transmitted to the output member from the internal combustion engine is not applied to the drive wheel,
wherein when the regenerative power generation is underway and the internal combustion engine is operative, the power generation amount increasing unit first controls the motor such that a predetermined load torque by which the output torque of the internal combustion engine is increased above the idling torque is applied to the internal combustion engine from the motor, and then controls the internal combustion engine such that a variation amount in a rotation speed of the internal combustion engine before and after the load torque is applied from the motor falls below a predetermined allowable value, and controls the generator such that the increase in the output torque of the internal combustion engine increased by the load torque applied thereto from the motor is canceled out by the increase in the power generation amount of the generator.

\* \* \* \* \*